United States Patent
Chang

(10) Patent No.: US 11,167,888 B2
(45) Date of Patent: Nov. 9, 2021

(54) MATERIAL BAG

(71) Applicant: Pao-Chung Chang, Taichung (TW)

(72) Inventor: Pao-Chung Chang, Taichung (TW)

(73) Assignee: Hon Buohb Co., Ltd., Taichung (TW)

( * ) Notice: Subject to any disclaimer, the term of this patent is extended or adjusted under 35 U.S.C. 154(b) by 0 days.

(21) Appl. No.: 16/891,066

(22) Filed: Jun. 3, 2020

(65) Prior Publication Data
US 2020/0290775 A1    Sep. 17, 2020

(30) Foreign Application Priority Data
Mar. 17, 2020 (TW) .................................. 109108783

(51) Int. Cl.
*B65D 33/16* (2006.01)
*B65B 39/08* (2006.01)

(52) U.S. Cl.
CPC .............. *B65D 33/16* (2013.01); *B65B 39/08* (2013.01)

(58) Field of Classification Search
CPC ............................... B65D 33/16; B65B 39/08
USPC ............................................ 383/22–24, 904
See application file for complete search history.

(56) References Cited

U.S. PATENT DOCUMENTS

| | | | | |
|---|---|---|---|---|
| 2,730,150 | A * | 1/1956 | Wunderwald | B65D 88/16 52/4 |
| 2,804,897 | A * | 9/1957 | Wunderwald | B65D 88/16 383/102 |
| 4,832,506 | A * | 5/1989 | Juel | B65D 88/1612 383/17 |
| 2016/0264305 | A1* | 9/2016 | Tanimoto | B65B 67/06 |
| 2017/0022016 | A1* | 1/2017 | James | B65G 65/00 |

FOREIGN PATENT DOCUMENTS

| | | | | |
|---|---|---|---|---|
| FR | 2286075 A1 * | 4/1976 | ......... | B65D 88/1693 |
| JP | 2005008275 A * | 1/2005 | ......... | B65D 88/1668 |
| WO | WO-2005118433 A1 * | 12/2005 | ......... | B65D 88/1681 |

* cited by examiner

*Primary Examiner* — Jes F Pascua

(57) ABSTRACT

A material bag includes a bag body and a sleeve on the bag body. A periphery of an opening of the sleeve is provided with a plurality of flexible tabs. An interval is defined between every two of the tabs. The tabs are separated from each other by the interval and connected to the periphery of the opening of the sleeve, so they can be independently flipped to form force-bearing faces to be clamped by a clamping device. When the folded material bag is used for powder/particle material packaging, the clamping device will act on the tabs for clamping the sleeve of the material bag. The clamping device can complete the transfer of the material bag and the connection between the sleeve of the material bag and a filling cylinder.

2 Claims, 11 Drawing Sheets

MATERIAL BAG

FIELD OF THE INVENTION

The invention relates to a material bag that can be mechanically moved by a clamping device, and more particularly to a material bag that is easy clamped for use.

BACKGROUND OF THE INVENTION

In general, after the production of powder/particle materials is completed, it is necessary to use material bags for packaging, which is convenient for transportation and storage. A conventional material bag has a bag body. The bag body has a filling space therein for filling powder/particle materials, a material inlet above the filling space, and a flexible thin sleeve extending from the upper end of the material inlet. The sleeve is extendable to be fitted onto a filling cylinder, so that the powder/particle materials can enter the filling space of the bag body through the filling cylinder for filling and packaging. Before the material bags are used for powder/particle material packaging, they needs to be folded and stacked one after the other to reduce the space occupied. However, after the material bag is folded, the sleeve of the material bag will be folded irregularly, resulting in that the shape of the opening of the sleeve is not consistent. Besides, the depth is very shallow. If an automatic machinery and apparatus is used for automatic filling, the mechanically moving clamping device is not easy to effectively and stably clamp the sleeve to be automatically sleeved on the filling cylinder. Therefore, the sleeve of the conventional material bag is manually fitted on the filling cylinder for filling materials, which causes a large burden on manpower costs. Accordingly, the inventor of the invention has devoted himself based on his many years of practical experiences to solve these problems.

SUMMARY OF THE INVENTION

The primary object of the invention is to provide a material bag that is easy clamped for use. The material bag has a bag body. The bag body has a filling space therein for filling powder/particle materials, a material inlet above the filling space, and a flexible thin sleeve extending from an upper end of the material inlet. The sleeve is extendable to be fitted onto a filling cylinder. A periphery of an opening of the sleeve is provided with a plurality of flexible tabs. An interval is defined between every two of the tabs. The tabs are separated from each other by the interval and are connected to the periphery of the opening of the sleeve, so they can be independently flipped to form force-bearing faces to be clamped by a clamping device in a simple and effective manner. When the folded material bag is used for powder/particle material packaging, a mechanically movable clamping device acts on the tabs for clamping the sleeve of the material bag. The mechanical movement of the clamping device can complete the transfer of the material bag and the connection between the sleeve of the material bag and the filling cylinder, so as to achieve the labor-saving economic benefits by automatically filling and packaging materials.

Preferably, each tab is a rectangular platy woven tab, having a long seam side and a flipable outer side opposite the seam side. The seam side is fixed to the periphery of the opening of the sleeve by sewing stitches, so that the opening of the cylindrical sleeve is restricted by the seam sides of the tabs to form a polygonal opening. Before use, the material bag is folded. The bag body and the sleeve are folded, not taking up space. Although the sleeve is folded irregularly, the shape of the opening is kept and restricted by the tabs that are flattened on the radial outer edge of the opening. Through the flat tabs on the periphery of the opening, the outer sides of the tabs can be lifted so that the platy body of each tab has a large clamping force-bearing surface. The clamping device can effectively clamp the tabs from the short, shallow and polygonal opening, and then simply complete the picking of the material bag. The flipable outer side of each tab is reversely folded and sewn to form an edge banding portion. The edge banding portion partially increases the thickness of the flipable outer side. When the clamping device clamps the tab, the edge banding portion serves as a reverse buckle point to improve the stability for the clamping device to clamp the tab.

Preferably, the surface of each tab is a rough surface, so that the surface of the tab has the anti-slip property when clamped, thereby providing an anti-slip effect when the clamping force of the clamping device acts on the tab.

Preferably, the surface of each tab has a color different from the colors of the bag body and the sleeve. When the clamping device clamps the material bag for use, the spatial position of the tab is obtained by identifying the color through the photography/camera equipment of the clamping device, so as to accurately control the clamping device to enter the opening for clamping the tabs on the periphery of the opening.

Preferably, the surface of each tab is provided with a mark or pattern. When the clamping device clamps the material bag for use, the spatial position of the tab is obtained by identifying the mark or pattern through the photography/camera equipment of the clamping device, so as to accurately control the clamping device to enter the opening for clamping the tabs on the periphery of the opening.

DETAILED DESCRIPTION OF THE PREFERRED EMBODIMENTS

Embodiments of the invention will now be described, by way of example only, with reference to the accompanying drawings.

Figure 1:
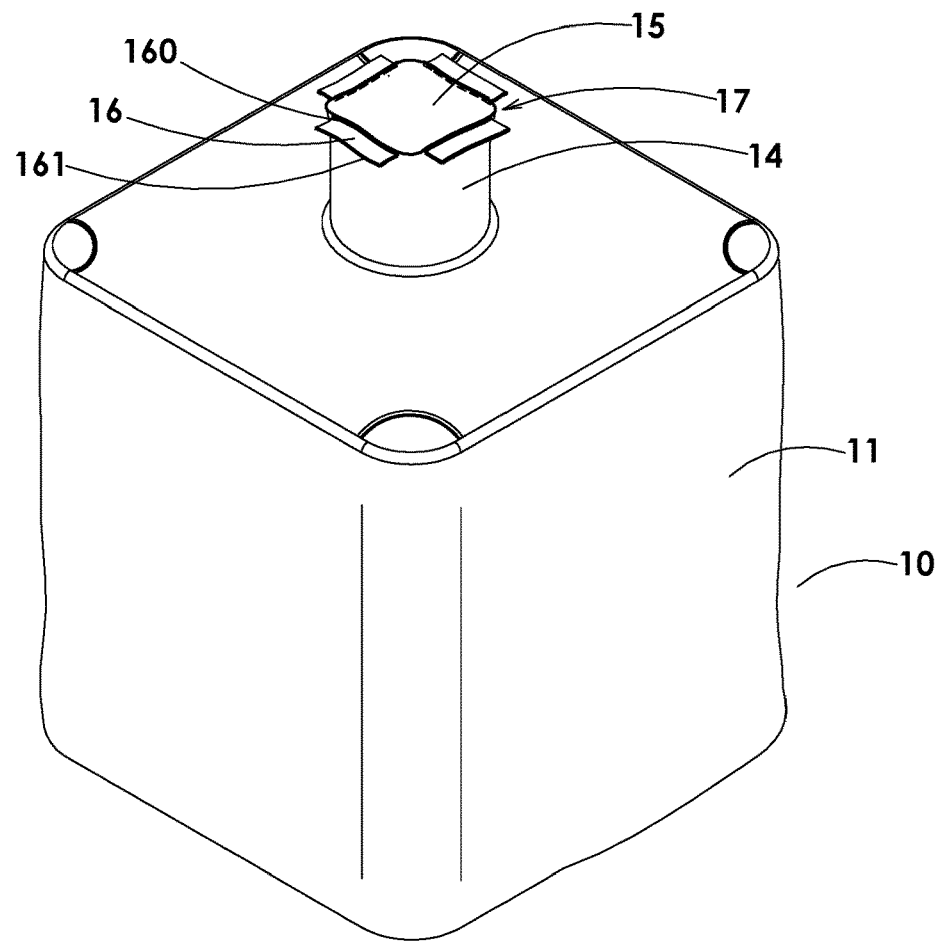
FIG. 1 is a perspective view of the invention.
Figure 2:
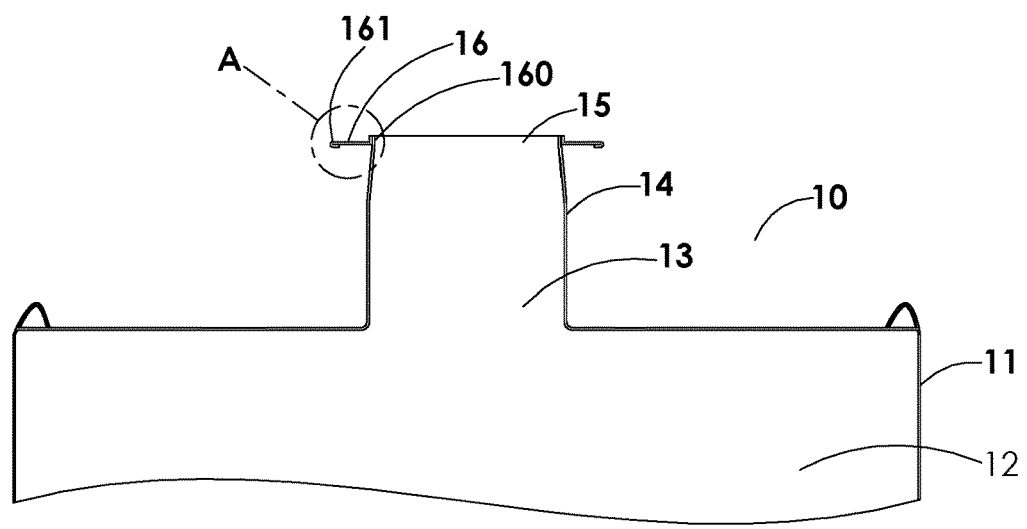
FIG. 2 is a cross-sectional view of the invention.
Figure 3:
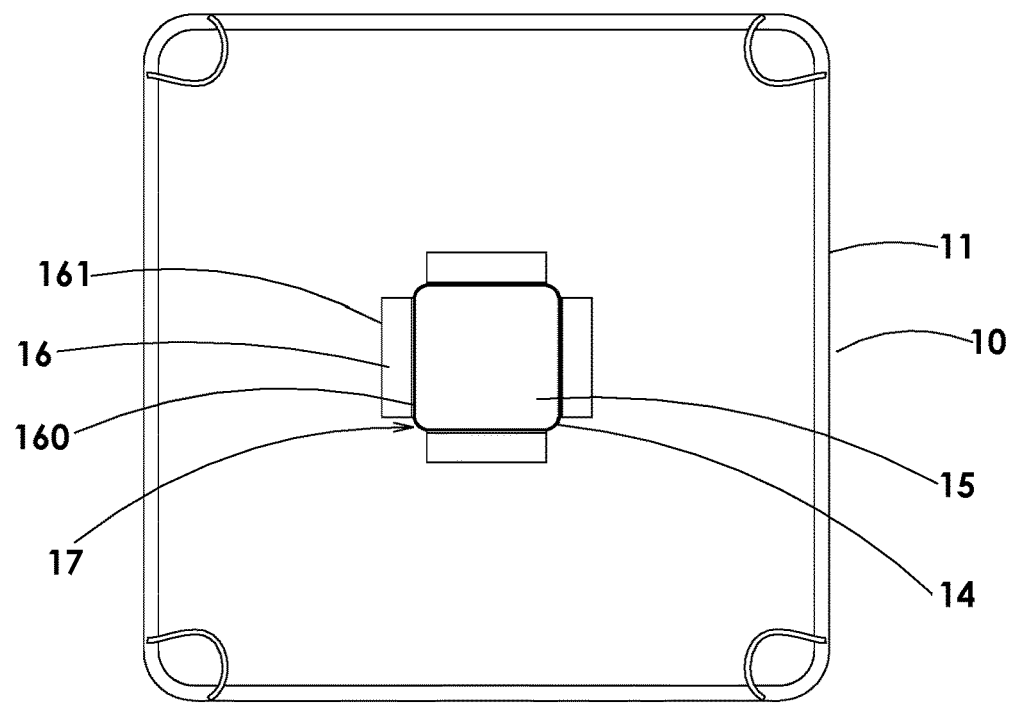
FIG. 3 is a top view of the invention.
Figure 4:
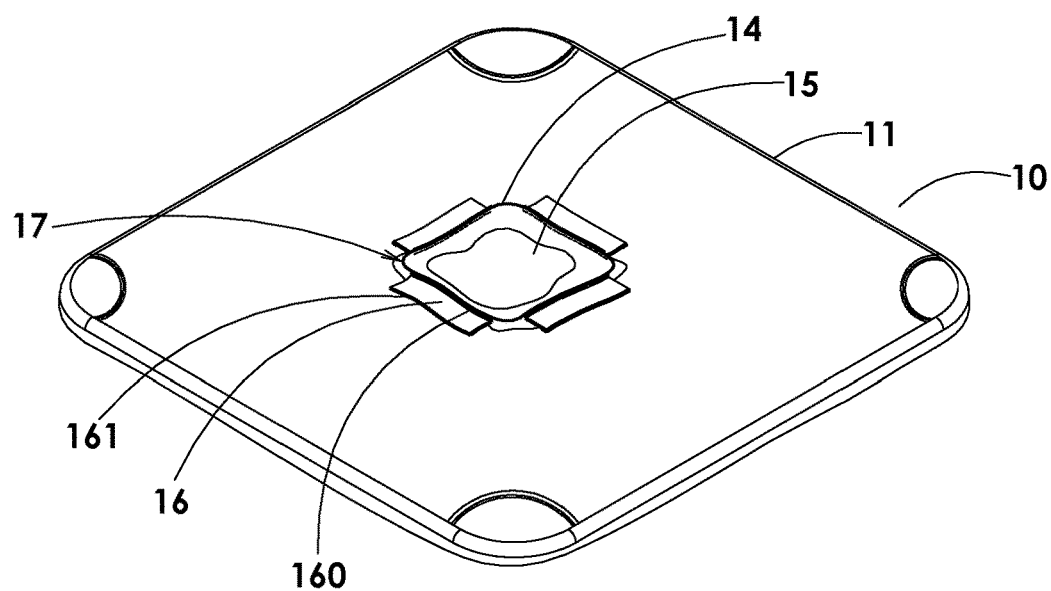
FIG. 4 is a schematic view of the invention when folded.
Figure 5:
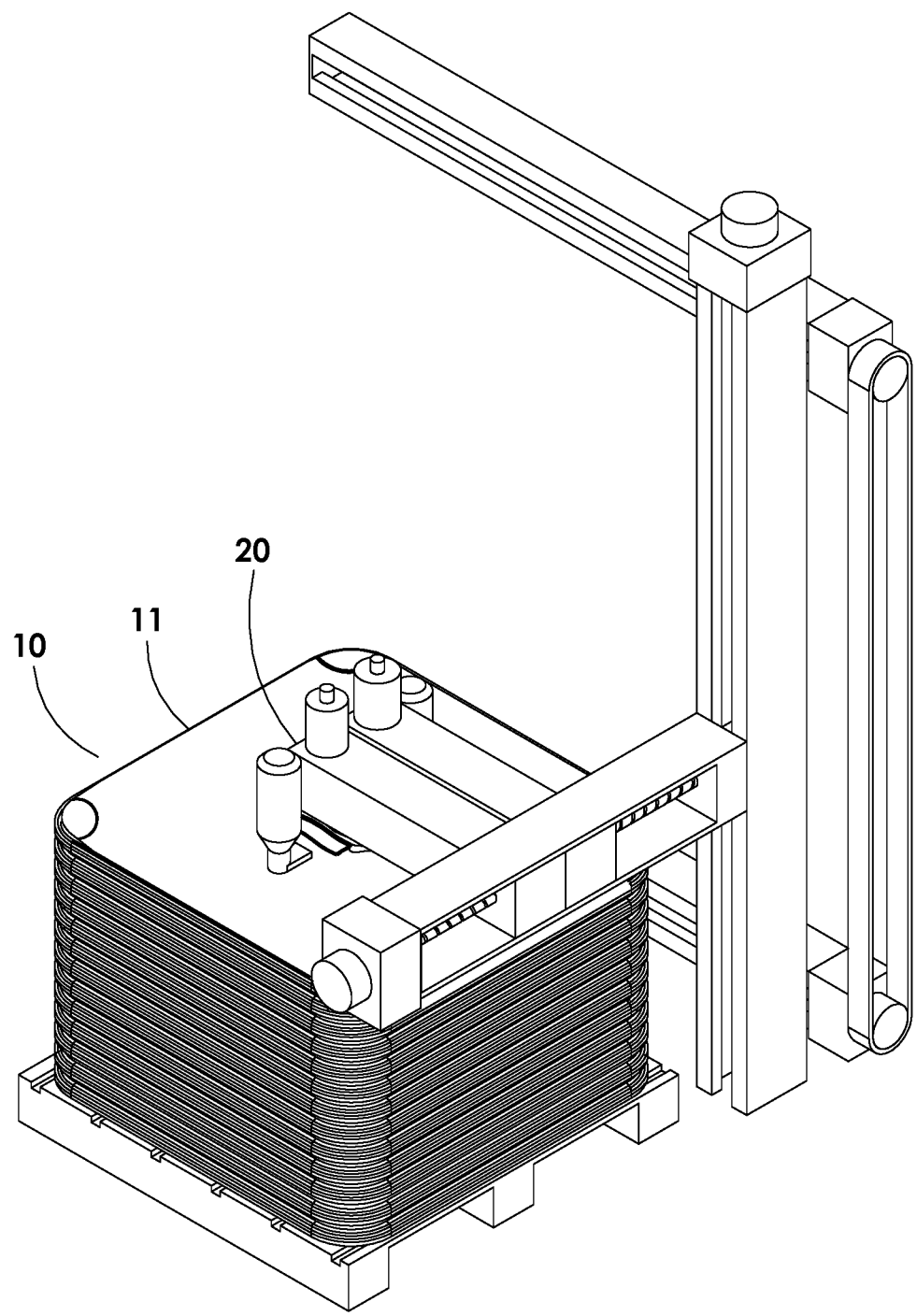
FIG. 5 is a schematic view of the invention, illustrating a plurality of stacked material bags to be clamped by the clamping device for use.
Figure 6:
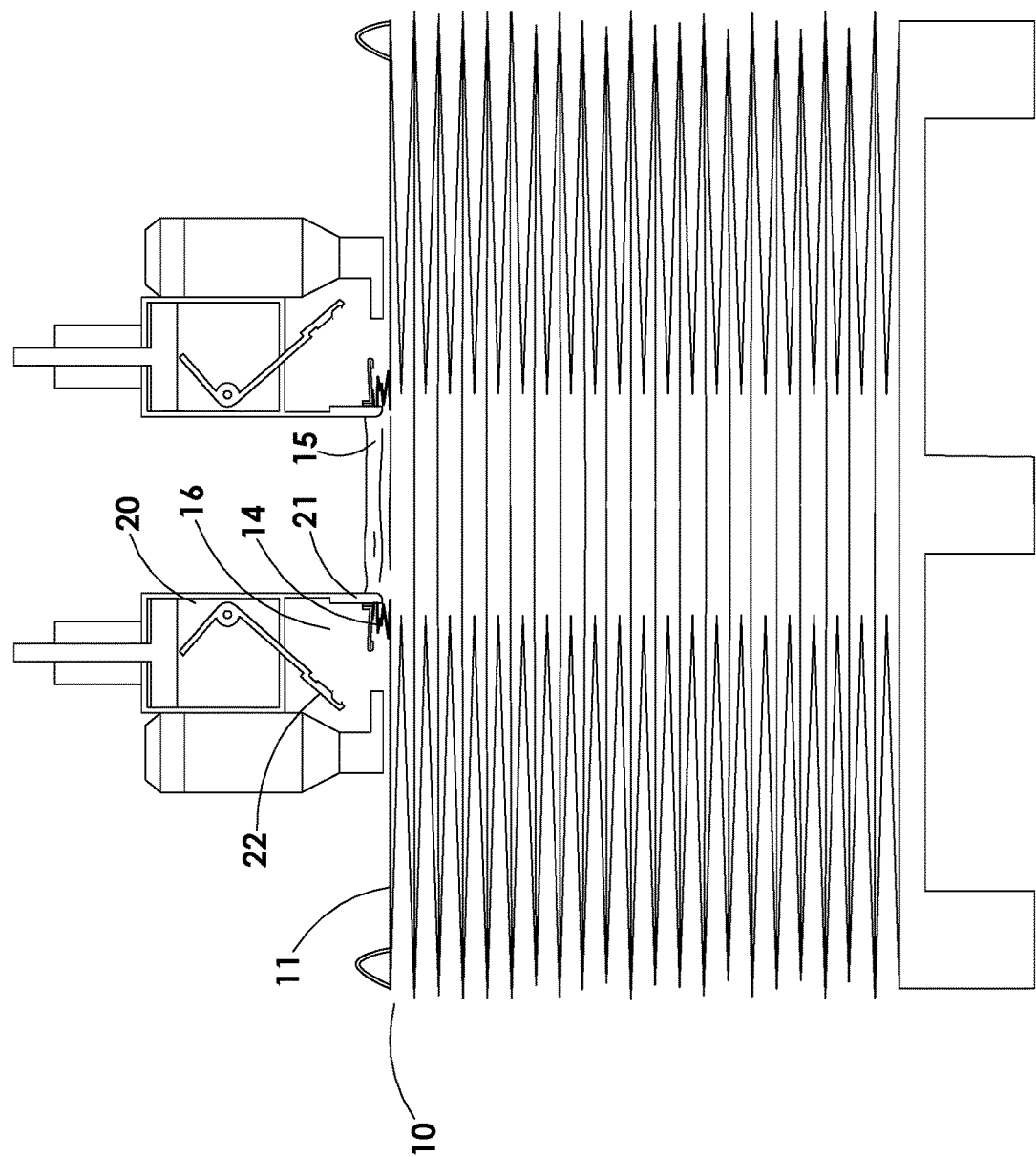
FIG. 6 is a schematic view of the invention, illustrating that the clamping arm of the clamping device enters the opening of the sleeve.
Figure 7:
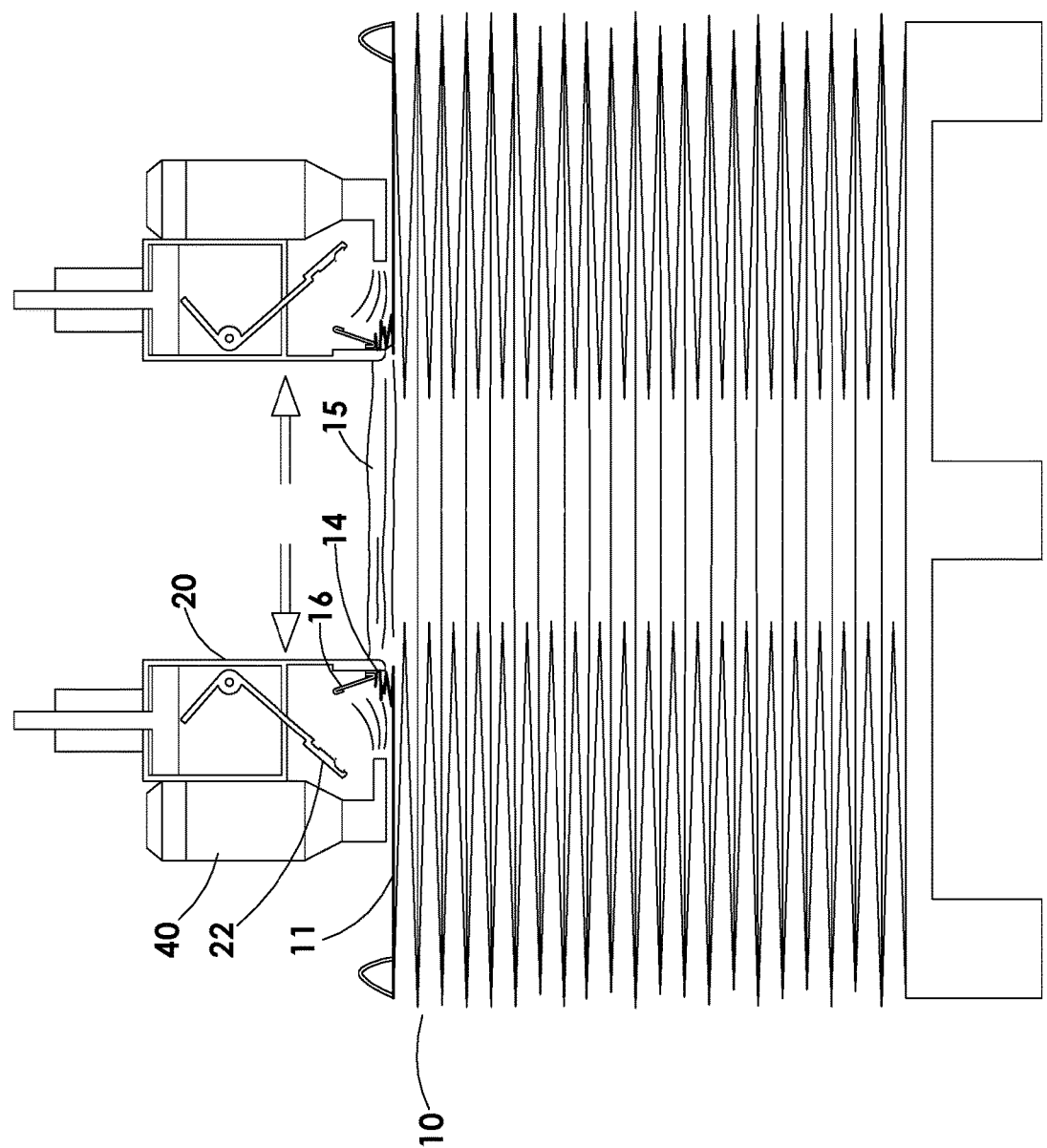
FIG. 7 is a schematic view of the invention, illustrating that the opening of the sleeve is expanded by the clamping arm of the clamping device.
Figure 8:
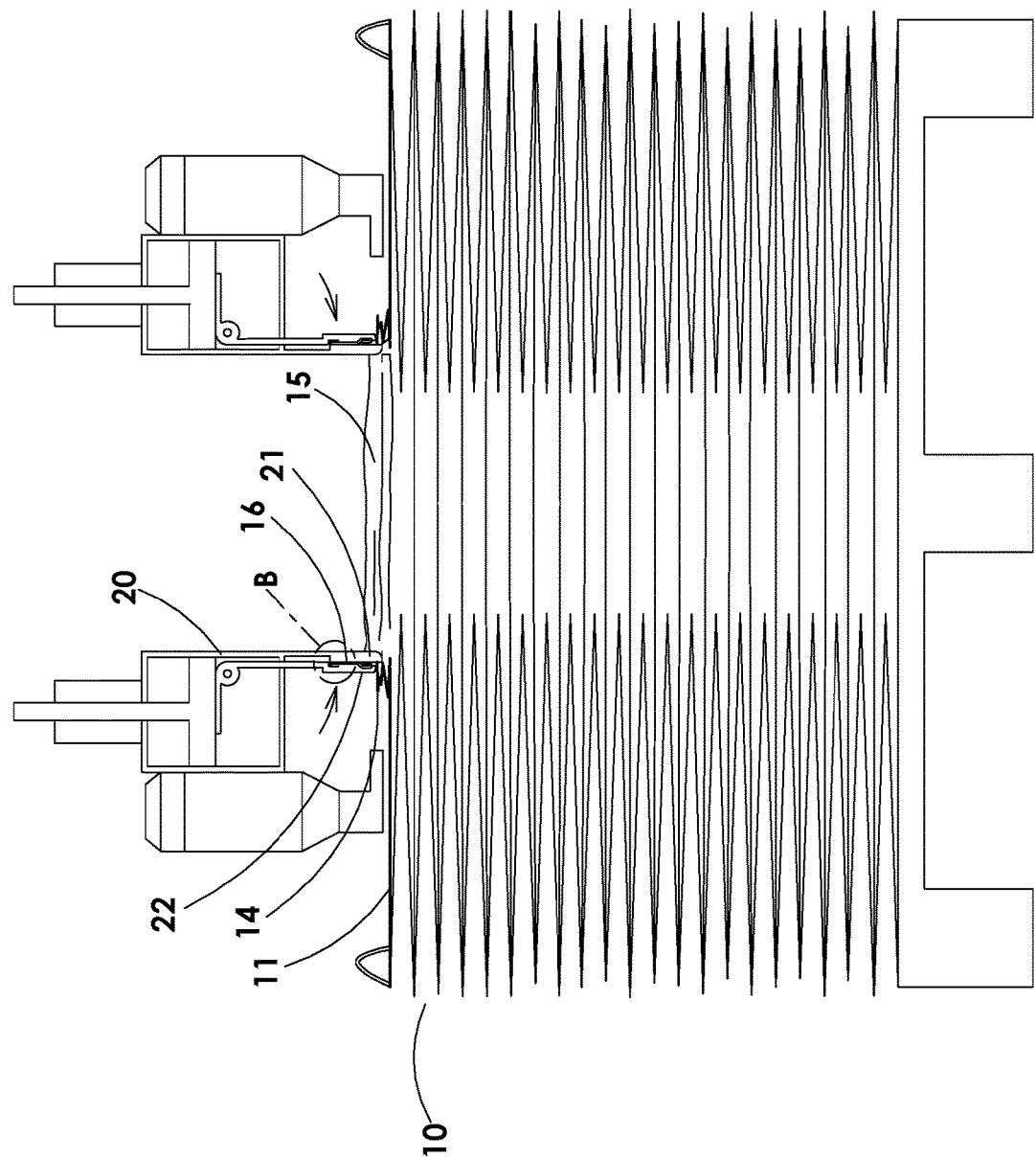
FIG. 8 is a schematic view of the invention, illustrating that the movable arm and the clamping arm of the clamping device cooperatively clamp the tab.

The invention provides a material bag that is easy clamped for use. Referring to FIGS. 1-3, a material bag 10 has a bag body 11. The bag body 11 has a filling space 12 therein for filling powder/particle materials, a material inlet 13 above the filling space 12, and a flexible thin sleeve 14 extending from an upper end of the material inlet 13. The sleeve 14 is extendable to be fitted onto a filling cylinder (not shown). The periphery of an opening 15 of the sleeve 14 is provided with a plurality of flexible tabs 16. An interval 17 is defined between every two of the tabs 16. The tabs 16 are separated from each other by the interval 17 and are connected to the periphery of an opening 15 of the sleeve 14, so they can be independently flipped to form force-bearing faces to be clamped by a clamping device in a simple and effective manner. As shown in FIG. 4 and FIG. 5, when the folded material bag 10 (a plurality of stacked material bags 10) is used for powder/particle material packaging, as shown in FIGS. 6-8, a mechanically movable clamping device 20 acts on the tabs 16 for clamping the sleeve 14 of the material bag 10. As shown in FIGS. 9-12, the mechanical movement of the clamping device 20 can complete the transfer of the material bag 10 and the connection between the sleeve 14 of the material bag 10 and the filling cylinder, so as to achieve the labor-saving economic benefits by automatically filling and packaging materials.

Figure 9:
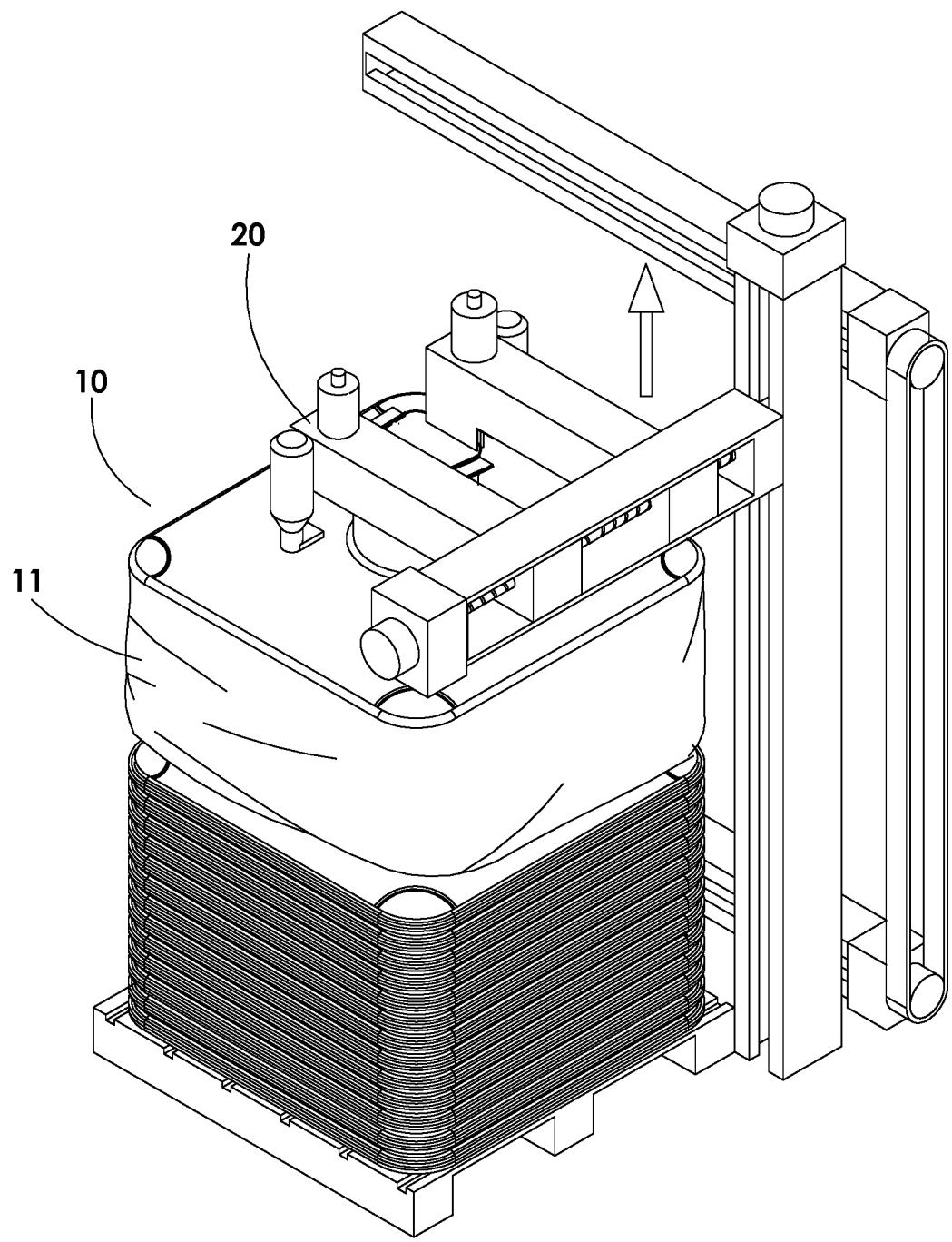
FIG. 9 is a schematic view of the invention, illustrating that the material bag is clamped by the clamping device.
Figure 10:
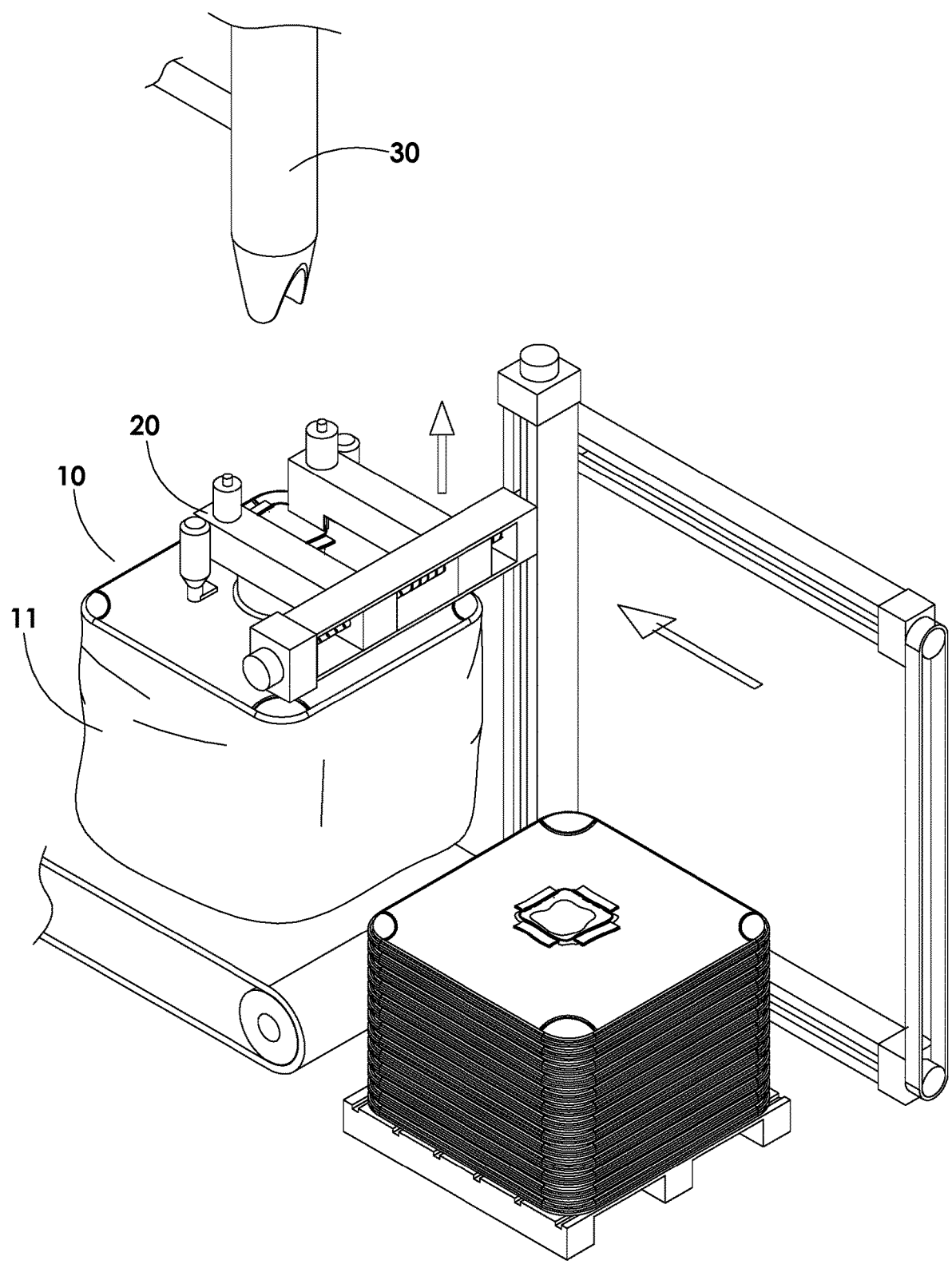
FIG. 10 is a schematic view of the invention, illustrating that the material bag is sent to the filling worktable by the clamping device.
Figure 11:
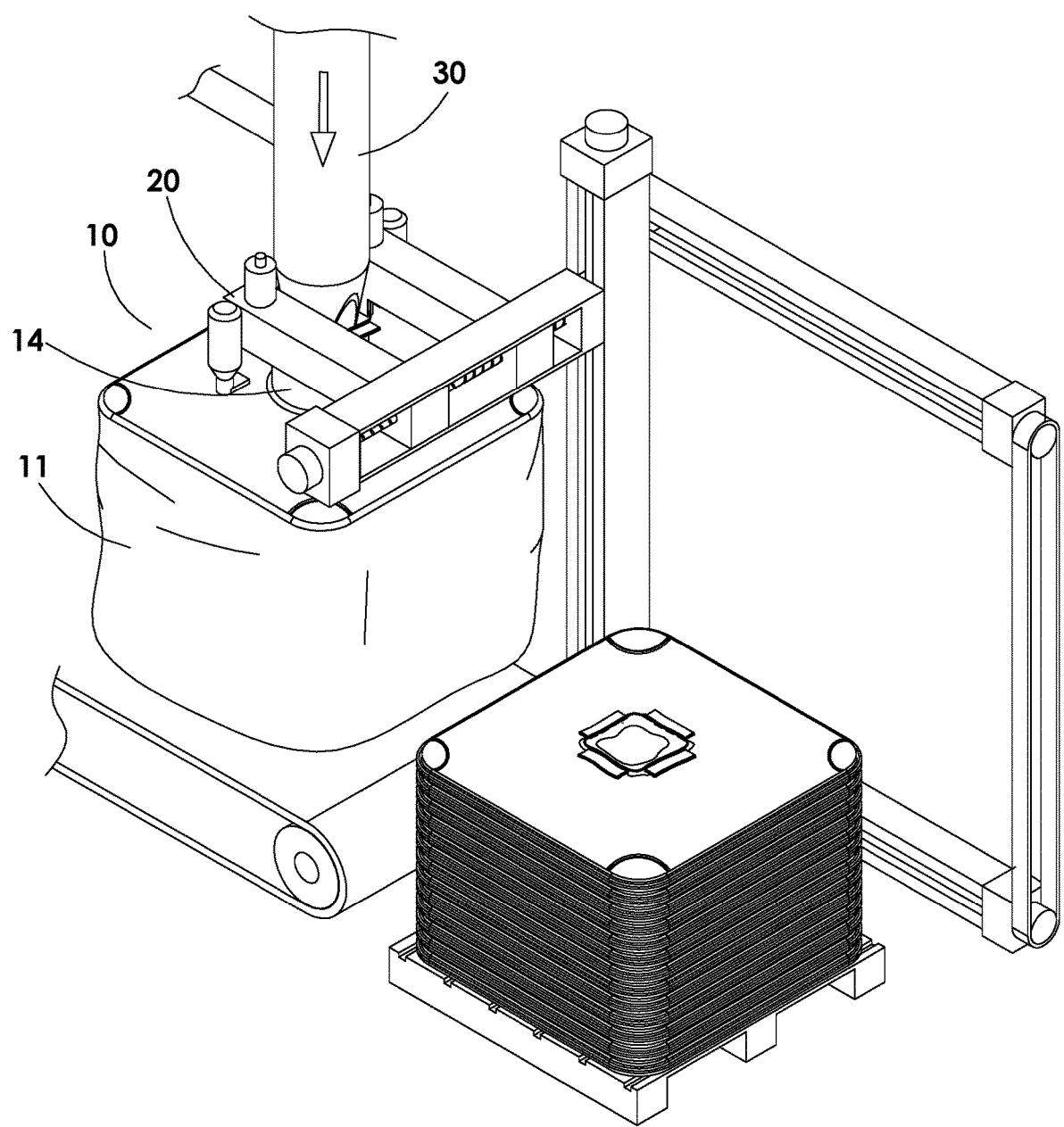
FIG. 11 is a schematic view of the invention, illustrating that the sleeve is fitted onto the filling cylinder.
Figure 12:
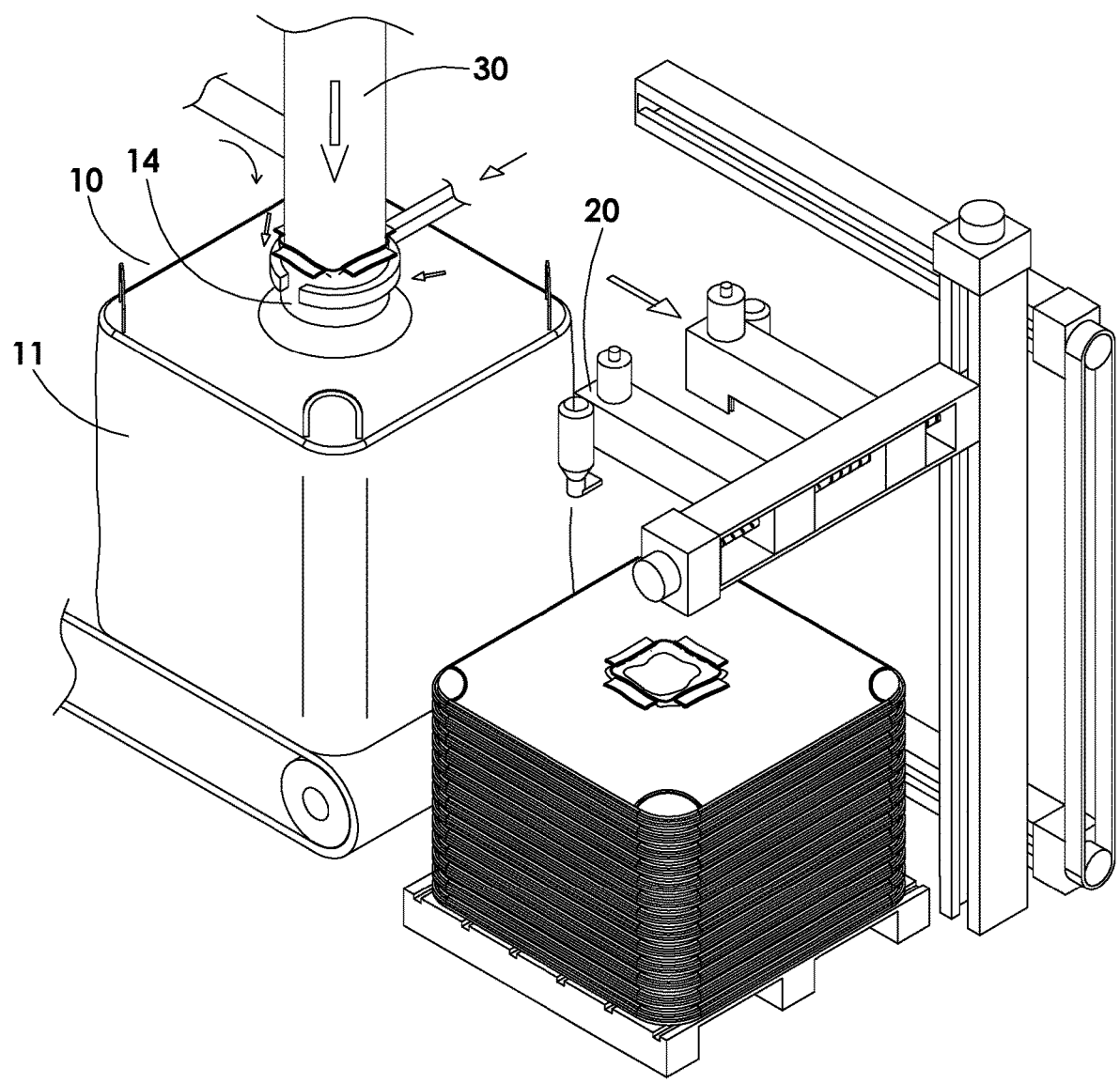
FIG. 12 is a schematic view of the invention, illustrating that the clamping device is moved away from the material bag after the sleeve is fitted onto the filling cylinder.

As shown in FIG. 5, the above-mentioned folded material bags 10 (a plurality of material bags 10 stacked on top of each other), one after the other, are used for powder/particle material packaging. As shown in FIG. 6, a clamping arm 21 of the clamping device 20 enters the opening 15 of the sleeve 14 in a folded state. As shown in FIG. 7, when the opening 15 of the sleeve 14 is opened (expanded), a blower 40 near the clamping device 20 blows the tabs 16, and the tabs 16 are blown up by the wind. As shown in FIG. 8, a movable arm 22 of the clamping device 20 and the clamping arm 21 cooperatively work on both sides of the tabs 16 to generate a stable and effective clamping force. In this way, through the path of movement (mechanical movement) of the clamping device 20 that is moved by linear rails, as shown in FIG. 9, the clamping device 20 can clamp the material bag 10 to the filling worktable, as shown in FIG. 10. As shown in FIG. 11 and FIG. 12, the sleeve 14 of the material bag 10 is sleeved on the filling cylinder 30, and it is expected to complete the automatic filling and packaging of the material.

Figure 13:
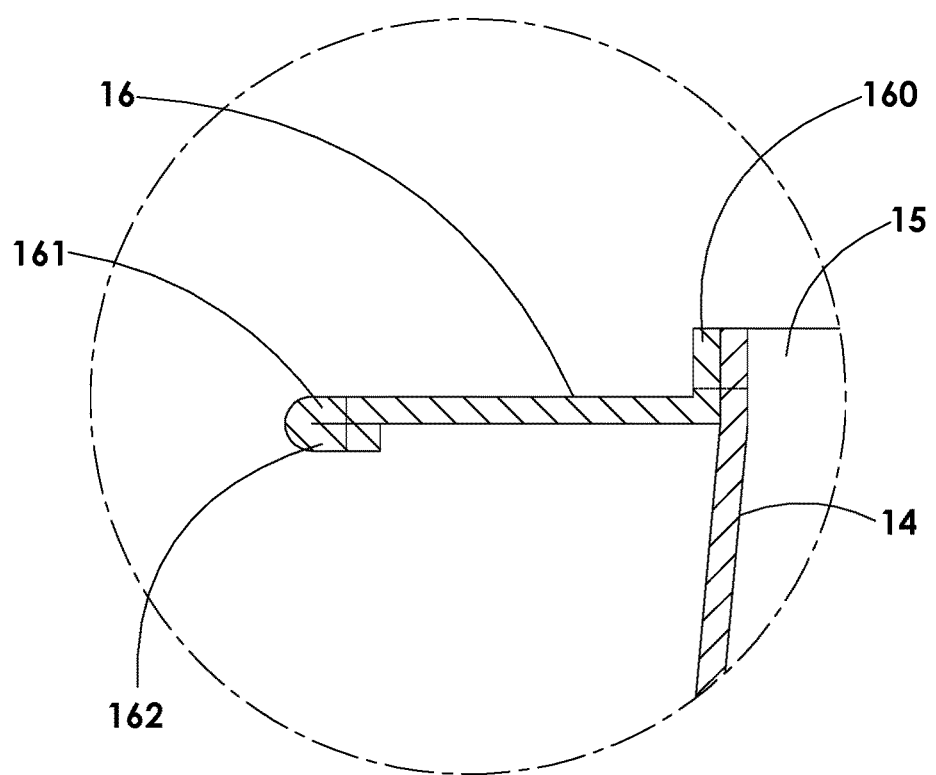
FIG. 13 is an enlarged view of circle A of FIG. 2.
Figure 14:
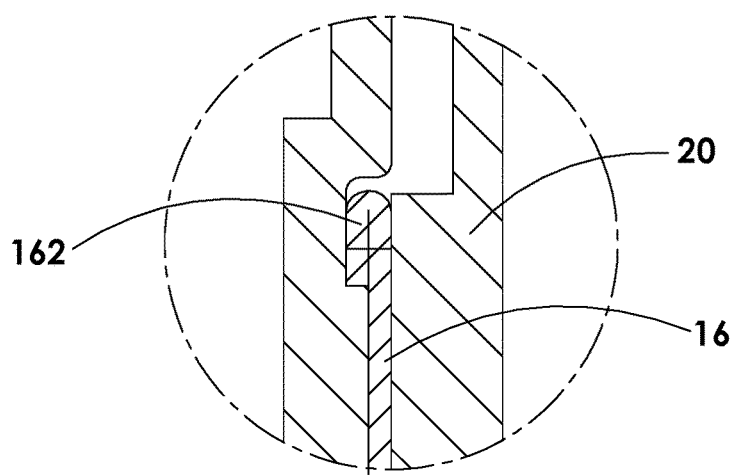
FIG. 14 is an enlarged view of circle B of FIG. 8.

According to the above embodiment, as shown in FIGS. 1, 2, 3, and 13, each tab 16 is a rectangular platy woven tab, having a long seam side 160 and a flipable outer side 161 opposite the seam side 160. The seam side 161 is fixed to the periphery (inner or outer periphery) of the opening 15 of the sleeve 14 by sewing stitches, so that the opening 15 of the cylindrical sleeve 14 is restricted by the seam sides 160 (sewing sides) of the tabs 16 to form a polygonal opening 15. As shown in FIG. 4, before use, the material bag 10 is folded, and the bag body 11 and the sleeve 14 are folded, not taking up space. Although the sleeve 14 is folded irregularly, the shape (polygonal shape) of the opening 15 is kept and restricted by the tabs 16 that are flattened on the radial outer edge of the opening 15. Through the flat tabs 16 on the periphery of the opening 15, the outer sides 161 of the tabs 16 can be lifted so that the platy body of each tab has a large clamping force-bearing surface. As shown in FIGS. 6, 7 and 8, the clamping device 20 can effectively clamp the tabs 16 from the short, shallow and polygonal opening 15, and then simply complete the picking of the material bag 10. As shown in FIG. 3 and FIG. 13, the flipable outer side 161 of each tab 16 is reversely folded and sewn to form an edge banding portion 162. The edge banding portion 162 partially increases the thickness of the flipable outer side 161. As shown in FIG. 8 and FIG. 14, when the clamping device 20 clamps the tab 16, the edge banding portion 162 serves as a reverse buckle point to improve the stability for the clamping device 20 to clamp the tab 16.

According to the above embodiment, as shown in FIG. 1, the surface of each tab 16 is a rough surface, so that the surface of the tab 16 has the anti-slip property when clamped, as shown in FIG. 8, so as to provide an anti-slip effect when the clamping force of the clamping device 20 acts on the tab 16.

According to the above embodiment, as shown in FIG. 1, the surface (at least the outer surface when flattened) of each tab 16 has a color different from the colors of the bag body 11 and the sleeve 14. As shown in FIG. 4, when the clamping device (not shown) clamps the material bag 10 for use, the spatial position of the tab 16 is obtained by identifying the color through the photography/camera equipment of the clamping device (not shown). As shown in FIGS. 6, 7 and 8, the system (not shown) accurately controls the clamping device 20 to enter the opening 15 for clamping the tabs 16 on the periphery of the opening 15.

According to the above embodiment, as shown in FIG. 1, the surface (at least the outer surface when flattened) of each tab 16 is provided with a mark or pattern (not shown). As shown in FIG. 4, when the clamping device (not shown) clamps the material bag 10 for use, the spatial position of the tab 16 is obtained by identifying the mark or pattern through the photography/camera equipment of the clamping device (not shown), as shown in FIGS. 6, 7 and 8, so as to accurately control the clamping device 20 to enter the opening 15 for clamping the tabs 16 on the periphery of the opening 15.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A material bag, having a bag body; the bag body having a filling space therein for filling powder/particle materials, a material inlet above the filling space, and a flexible thin sleeve extending from an upper end of the material inlet, the sleeve being extendable to be fitted onto a filling cylinder, wherein a periphery of an opening of the sleeve is provided with a plurality of flexible tabs and an interval is defined between every two of the tabs; and wherein each tab is a rectangular platy woven tab, having a long seam side and a flipable outer side opposite the seam side, the seam side is fixed to the periphery of the opening of the sleeve by sewing stitches, so that the opening of the sleeve is restricted by the seam sides of the tabs to form a polygonal opening.

2. The material bag as claimed in claim 1, wherein the flipable outer side of each tab is reversely folded and sewn to form an edge banding portion.

\* \* \* \* \*